May 2, 1967

E. DEEG 3,317,732

PHOTOSENSITIVE DEVICE USING GLASS OF ARSENIC, SULFUR AND
HALOGEN; METHOD OF USING THE DEVICE; AND
METHOD OF MAKING THE GLASS

Filed March 29, 1963

INVENTOR
EMIL DEEG

BY
ATTORNEYS

United States Patent Office 3,317,732
Patented May 2, 1967

3,317,732
PHOTOSENSITIVE DEVICE USING GLASS OF ARSENIC, SULFUR AND HALOGEN; METHOD OF USING THE DEVICE; AND METHOD OF MAKING THE GLASS
Emil Deeg, Mainz-Gonsenheim, Germany, assignor to Jenaer Glaswerk Schott & Gen., Mainz, Germany, a corporation of Germany
Filed Mar. 29, 1963, Ser. No. 269,118
Claims priority, application Germany, Apr. 3, 1962, J 21,548
11 Claims. (Cl. 250—211)

The invention relates to a photoresistor of the kind that is used, for example, in photocells, and to a process for the manufacture of the photosensitive parts of such photoresistors.

Photoresistors are known in which the photosensitive part consists, for example, of cadmium sulfide, lead sulfide, indium antimonide or cadmium selenide. The resistance values of these known photoresistors range approximately between 10 ohms and 100,000 megohms.

It has now been found that glasses of the arsenic-sulfur-halogen multisubstance systems have a remarkable photosensitivity. The photoresistor according to the invention is thus characterized by the fact that the photosensitive part consists of glasses of the arsenic-sulfur-halogen multisubstance systems. The high total-darkness resistance of the photoresistors of the invention has proven advantageous to the art, as it achieves values of as much as $10^{15}$ ohms. Furthermore, the photoresistors of the invention can be made very simply from a molten mass by known glassmaking methods.

In the process of the invention for the manufacture of the photosensitive parts of photoresistances, raw materials consisting of the elements arsenic, sulfur, chlorine and/or bromine and/or iodine or their compounds are used to make the glasses.

It is also expedient for the charge to be used for making the glass to consist of an arsenic sulfide, e.g. arsenic trisulfide ($As_2S_3$) sulfur and iodine.

The iodine can be replaced by bromine or chlorine or sulfur chloride ($S_2Cl_2$). A charge consisting of arsenic trisulfide, sulfur chloride, bromine and iodine has also proven to be well suited. The glasses are made expediently in a vacuum, with no pumping during the melting process, or in an inert gas atmosphere such as nitrogen or helium.

The following table shows a number of suitable compositions (in wt. percent) of glasses for the photosensitive part of the photoresistor according to the invention.

| Specimen No. | As | S | I | Br | Cl | Reaction Temperature |
|---|---|---|---|---|---|---|
| 44 Br | 40 | 50 |   | 10 |   | 580 |
| 44 Cl | 40 | 50 |   |   | 10 | 570 |
| 34 | 40 | 40 | 20 |   |   | 560 |
| 5/3 | 46 | 51 | 1 | 1 | 1 | 620 |

The invention will be further explained with reference to the drawings.

In the drawings, like reference characters refer to corresponding parts.

Figure 1:
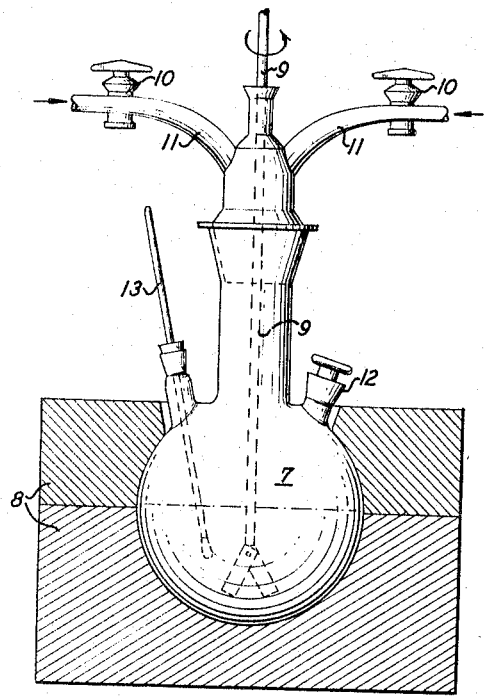
FIG. 1 shows a reaction apparatus.

The glasses can be manufactured in the following manner, for example. In a round-bottomed flask 7 made of a borosilicate glass of high chemical resistance, such as "Duran 50," the finely pulverized charge (if the glasses are being made of powdered raw materials) is placed. Before the melting begins, the powdered components are mixed thoroughly together. In the case of a charge of about 100 grams, the flask is closed and shaken by hand for about one minute to achieve this. The charge is melted in a controllable electric heater 8 whose shape is fitted to that of the round-bottomed flask. The melting temperature must be adapted in each case to the composition of the glass. An electrically driven agitator 9 serves to keep the melt uniform, and its rotatory speed is continuously variable, being adjusted in each case to the viscosity of the melt; in the case of high viscosities, the rotatory speed amounts to about one third of a revolution per second, and for lower viscosities (higher temperature) the speed is about three revolutions per second. It has proven necessary to regulate the atmosphere over the molten mass, to achieve this, two glass inlet tubes 11 are provided on the reaction vessel, which can be closed by stopcocks 10; these tubes can also be used to produce a vacuum in the reaction chamber. Raw materials that have to be added in liquid form to the charge, such as bromine or sulfur chloride, are poured onto the powdered mixture through the inlet opening 12. In this case, too, the mixture is blended by shaking. If larger amounts of glass are to be manufactured, it is desirable to use a cylinder closed at the bottom instead of the round-bottomed flask. A dome cover is placed on this crucible, the cover containing openings corresponding to those in the flask in FIG. 1. A thermometer 13 serves for temperature measurement.

Instead of a single-vaned agitator as used in the flask, an agitator can be used which has a plurality of vanes mounted one over the other on the shaft.

In addition to the elements already mentioned, arsenic, sulfur, iodine, bromine and chlorine, various compounds of same can be used. It has proven especially advantageous to introduce the arsenic, for example, in the form of arsenic trisulfide (doubly sublimated) and add elementary sulfur or elementary arsenic only as a supplement to achieve the desired composition. The sulfur used for the manufacture of the glasses can be triply sublimated. The halogens can also be introduced in the form of chemical compounds. For example, the use of sulfur chloride has proven to be valuable for the introduction of chlorine into multiple-component glasses of the above-mentioned system. Since the compound sulfur chloride is liquid at room temperature, it is much easier to handle than chlorine in the gaseous state.

After the melt has been thoroughly mixed, it is poured into a mold and allowed to cool. The mold usually also consists of a borosilicate glass, such as "Duran 50," which is particularly appropriate because of its low thermal expansion. The required test specimens are cut from the castings and ground and polished. Sheets and fibers can be drawn directly from the thoroughly mixed molten mass. Despite the relatively high vapor pressure of the halogens, it is possible to keep the composition of the glasses almost constant during the melting process. The differences between the synthesis values and those determined by analysis amount to approximately plus or minus 1% by weight.

The production of a piece of raw glass from one of the described examples will further clarify the procedure.

A glass of the following composition will be used as the example:

46 wt. percent arsenic
51 wt. percent sulfur
1 wt. percent iodine
1 wt. percent bromine
1 wt. percent chlorine The raw materials to be introduced in solid form, i.e. 1020 g. arsenic trisulfide (doubly sublimed), 150 g. sulfur (doubly sublimed), 12 g. iodine (single sublimation), are pulverized by hand with the exclusion of moisture. These components are poured into a round-bottomed flask made of "Duran 50" and through shaking, the mixture is homogenized, as is described above. Then 13.8 ml. $S_2Cl_2$ is poured, with the exclusion of moisture, into the reaction vessel over the powdered components therein. Then the vessel and all the components contained therein are shaken for a few seconds to distribute the $S_2Cl_2$ uniformly in the powder. As a last step, by way of a spout, 4.2 ml. bromine are poured over the mixture. In order to reduce the vapor pressure of this material, which is liquid at room temperature, the container as well as the reaction vessel are refrigerated to about 5° C. before the bromine is poured over the mixture. In this case, too, moisture must be excluded. The carefully sealed reaction vessel is placed in the heater and, while it is still cold, it is evacuated to a pressure of about 1 mm. of mercury. Then the reaction vessel is heated to the required reaction temperature of about 350° C. The mixture is kept at this temperature for about 20 minutes with constant stirring. Then it is poured into a Petri dish made of "Duran 50." In this manner it is possible to produce bodies free of bubbles and striae having a volume of about 2500 cubic centimeters.

Figure 2:
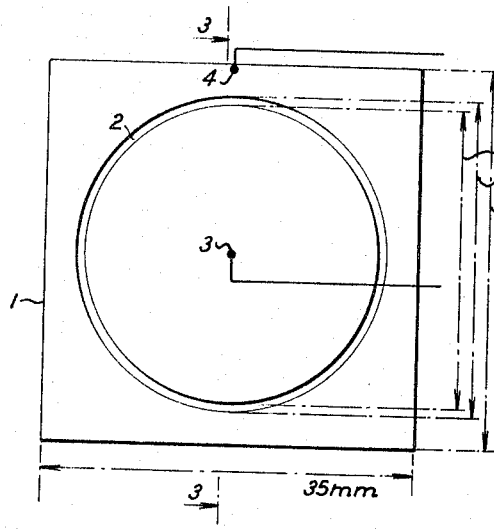
FIG. 2 is a view of a photoresistor device according to the invention.
Figure 3:
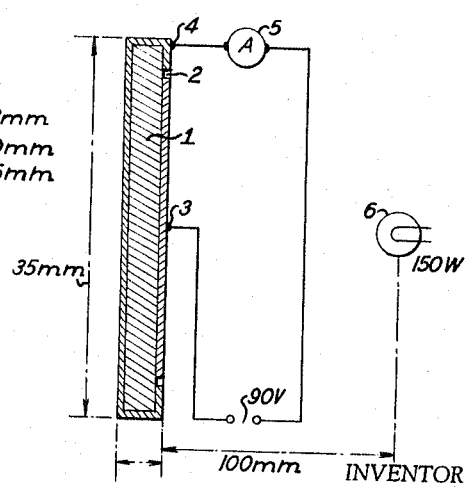
FIG. 3 is a cross-sectional view of the device shown in FIG. 2, taken along line 3—3 in FIG. 2.

As shown in FIGS. 2 and 3, a plate 1 with a surface measuring 35 x 35 mm. and a thickness of 3 mm. is used for the following measurements. The plate is silvered on both sides, except for an unsilvered annular portion 2 having a width of 2 mm. A current of 90 volts is applied to the circular center portion 3 of the plate and the outside portion 4, in series with an ammeter 5. The plate is then illuminated at a distance of 100 mm. by means of an incandescent lamp 6 of 150 watts. A glass om composition 44 Br (the composition of this glass is given in the table above) produces, at an applied voltage of 90 v., e.g. a resistance in total darkness of $1,000 \times 10^{12}$ ohms, which decreased upon exposure to light to $10 \times 10^{12}$ ohms. Using the arrangement of electrodes as shown in FIG. 2 and a lightsource as mentioned above, the following resistance values can be obtained:

| Specimen No. | Resistance in total darkness | Resistance under illumination |
| --- | --- | --- |
| 44 Br | $1,000 \times 10^{12}$ ohms | $10 \times 10^{12}$ ohms. |
| 44 Cl | $190 \times 10^{12}$ ohms | $2.4 \times 10^{12}$ ohms. |
| 34 | $600 \times 10^{12}$ ohms | $12 \times 10^{12}$ ohms. |
| 5/3 | $105 \times 10^{12}$ ohms | $2 \times 10^{12}$ ohms. |

Figure 4:
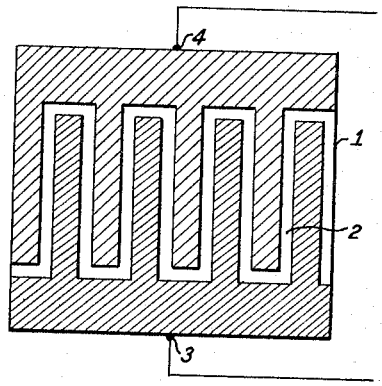
FIG. 4 is a view corresponding to FIG. 2, and showing a device of a modified construction.

It is also possible in a known fashion, as shown in FIG. 4, to apply the electrodes in the form of two combs, the teeth of the one electrode intermeshing with the interstices of the other.

The sensitivity of the finished photoresistors, which can be enclosed in glass for protection, can be increased by heat treatment. For example, the resistance ratio, measured at room temperature, of a photoresistor with comb electrodes and made of glass 5/3 can be raised from 4 to 8 after having been heated four times for nine hours each time at 100° C.

Glass is, according to ASTM Designation C162–56 (ASTM Standards, Part 13, 1964), in this patent application an inorganic product of fusion which has cooled to a rigid condition without crystallizing. However it should be realized that glasses in the systems mentioned above devitrify easily at room temperature if the halogen content is approximately 20 wt. percent or more.

What is claimed is:

1. A photosensitive device comprising:
   (a) a photoresistor;
   (b) means for applying a potential to the photoresistor, said photoresistor comprising a glass having arsenic, sulfur and halogen components.

2. A device according to claim 1, and including means for indicating response of the photoresistor to a photoresistor activating source.

3. A device according to claim 1, said photoresistor having a total darkness resistance of $10^{15}$ ohms.

4. A photosensitive device according to claim 1, said photoresistor comprising at least 40% arsenic by weight, at least 40% sulfur by weight and up to 20% halogen by weight.

5. A photosensitive device according to claim 1, the photoresistor containing said components in about the following proportions by weight:

40 wt. percent arsenic
50 wt. percent sulfur
10 wt. percent bromine

6. A photosensitive device according to claim 1, the photoresistor containing said components in about the following proportions by weight:

40 wt. percent arsenic
50 wt. percent sulfur
10 wt. percent chlorine

7. A photosenstive device according to claim 1, the photoresistor containing said components in about the following proportions by weight:

40 wt. percent arsenic
40 wt. percent sulfur
20 wt. percent iodine

8. A photosensitive device according to claim 1, the photoresistor containing said components in about the following proportions by weight:

46 wt. percent arsenic
51 wt. percent sulfur
1 wt. percent iodine
1 wt. percent bromine
1 wt. percent chlorine 9. A photosensitive device according to claim 1, the said halogen being selected from the group consisting of bromine, chlorine, iodine and mixtures thereof.

10. The method of measuring radiation which comprises:
    (a) applying an electrical potential to a photoresistor comprising an arsenic, sulfur, halogen glass;
    (b) exposing the said glass to a photoresistor actuating source; and
    (c) sensing response to said exposure.

11. Process for production of a photosensitive glass which comprises forming a melt of arsenic, sulfur, and a halogen, and cooling the melt to solidify it and provide a glass, said melt being formed by steps comprising admixing arsenic trisulfide and $S_2Cl_2$.

References Cited by the Examiner

UNITED STATES PATENTS 3,024,119   3/1962   Flaschen et al. _____ 106—47

OTHER REFERENCES

Herbert S. Allen, Photoelectricity, pub. 1913, pp. 75–79.
Flaschen et al., Journal of Applied Physics, vol. 31, January-April 1960, pp. 219, 220.
Flaschen et al., Journal of the American Ceramic Society, vol. 43, No. 60, pp. 274–278.

WALTER STOLWEIN, *Primary Examiner.*